United States Patent
Fried

[15] 3,683,893
[45] Aug. 15, 1972

[54] MUSCLE ACTIVITY RECORDER

[72] Inventor: Robert Fried, 28 Colburn Rd., East Brunswick, N.J. 08816

[22] Filed: July 17, 1970

[21] Appl. No.: 55,900

[52] U.S. Cl. ............................... 128/2 S, 128/2.05 Q
[51] Int. Cl. ................................................ A61l 5/00
[58] Field of Search .......... 128/2 N, 2 R, 2 S, 2.05 Q, 128/2.05 R, 2.08; 33/174 D

[56] References Cited

UNITED STATES PATENTS

| | | | |
|---|---|---|---|
| 2,452,799 | 11/1948 | Speaker et al. | 128/2 S |
| 3,533,398 | 10/1970 | Jones | 128/2 R |
| 2,720,113 | 10/1955 | Statham | 128/2.05 Q |
| 2,139,509 | 12/1938 | Marcellus | 128/2.05 Q |
| 2,839,050 | 6/1958 | Sokol | 128/2 S |

FOREIGN PATENTS OR APPLICATIONS 353,787   5/1922   Germany .................... 128/2 S

*Primary Examiner*—William E. Kamm
*Attorney*—Ostrolenk, Faber, Gerb & Soffen

[57] ABSTRACT

A system for providing visual observation of changes in muscle tonus and muscle contraction concomitant with self-initiated changes in muscular activity, especially in applications where kinesthetic sensation is deficient. Muscular activity is sensed by compressible means which provides a signal in the form of an air flow of appropriate positive or negative pressure values which, in turn, is converted into an electrical signal which is ultimately transformed into a visually observable meter reading for enhancing kinesthetic-somesthetic perception and for enhancing the subject's control over the musculature of interest.

4 Claims, 2 Drawing Figures

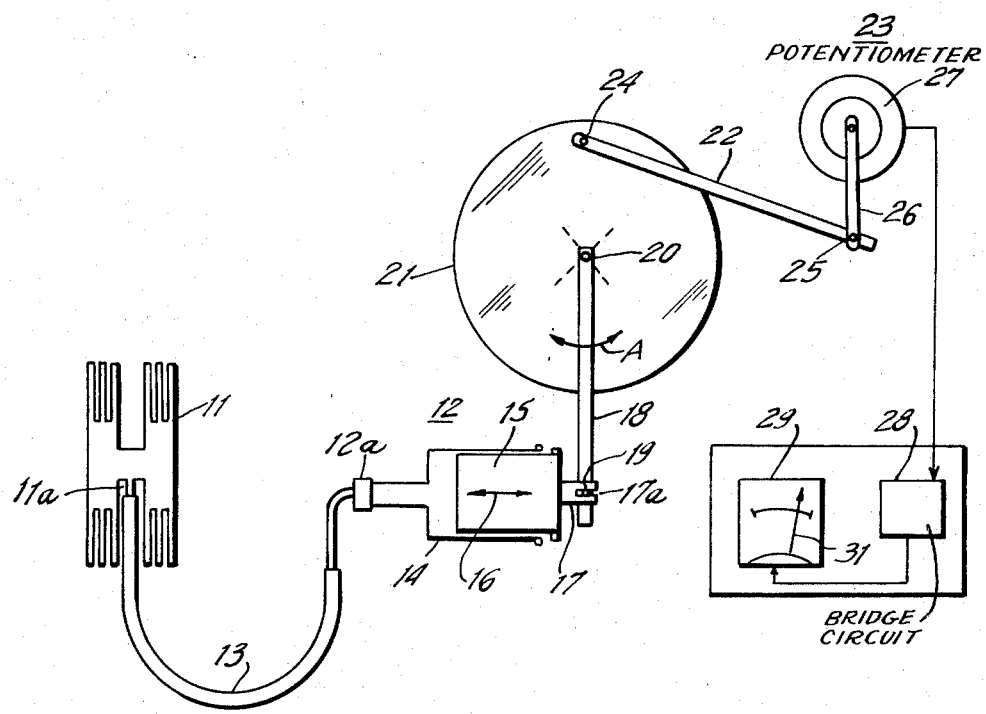
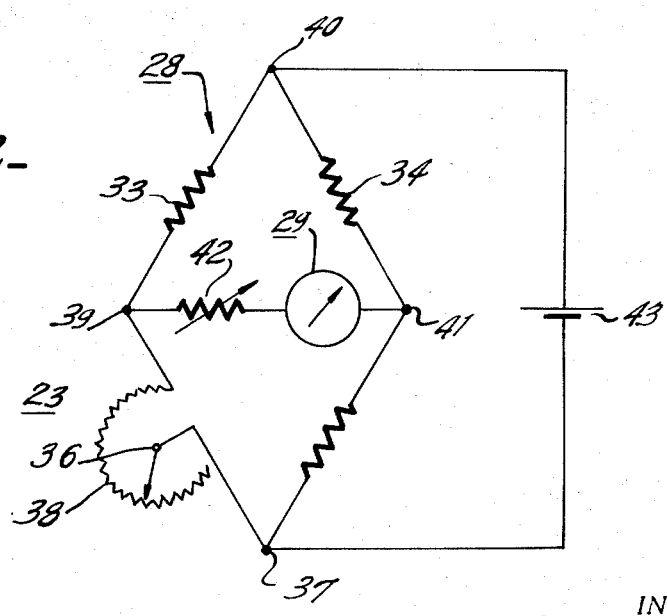
INVENTOR.
ROBERT FRIED
BY
Ostrolenk, Faber, Gerb & Soffen
ATTORNEYS

MUSCLE ACTIVITY RECORDER

The present invention relates to sensing means for sensing changes in physical movement or orientation and more particularly to a myotonal-kinesthetic feedback system for providing visually observable readings representing changes in muscle tonus and muscular contractions concomitant with the self-initiation of such muscular activity on the part of the subject.

There exists a variety of clinical situations in which it is desirable to provide visually observable information relating to the nature and degree of muscle activity, especially in applications wherein the control of muscular activity is made known, or indicated visually in ares in which kinesthetic sensation proper is deficient or otherwise impaired.

One of the most common complaints encountered in the case of human female frigidity is that associated with anesthesia of the vaginal musculature and associated areas. In order to successfully train patients with such anesthesia to relax or contract vaginal musculature, it is essential to provide a method which makes it possible to establish some definitive feedback as to the nature of the effect of trial and error contractions, as well as their magnitude and duration. The present invention is characterized by providing a myotonal-kinesthetic feedback system subject's enables the subject to visually observe the effect of the subjects efforts to contract and relax the vaginal musculature concomitant with the self-initiated efforts to do so.

The present invention is comprised of a resilient compressible bellows assembly designed and configured so as to be readily insertable into the vagina very near the entrance thereof. The motion of the vaginal musculature imparted to the bellows as a result of the self-initiated efforts to do so is first converted into mechanical movement by a suitable piston assembly. This movement, in turn, is converted into more sensitive mechanical movement by means of a mechanical amplifier assembly which, in turn, controls the output of an electrical bridge circuit. The electrical bridge circuit is monitored by an electrical meter having a visually observable indicating arm to provide the desired feedback. Trial and error contractions of the lower abdominal muscle groups afford the subject visual indication of those movements which affect muscular contractions of the greatest magnitude. Consequently, exercises which are capable of producing vaginal muscle contractions of the greatest possible feedback mechanism perceived magnitude are enhanced through the use of the feedback system in that they increase the subject's control over the musculature; they also increase the vascularization of the muscle groups and they enhance kinesthetic-somesthetic perception by activating neuropathways along with changes in muscle tonus.

It is, therefore, one object of the present invention to provide a novel myotonal-kinesthetic feedback system capable of providing visually observable readings of muscle activities concomitant with the self-initiated muscle contractions of the subject.

Another object of the present invention is to provide a novel myotonal-kinesthetic feedback system for providing a subject with the capability of enhancing control over musculature of the area of the body of interest by converting such musculature contraction into a visually observable reading which indicate those movements practiced by the subject which affect muscle contractions of the greatest magnitude and duration.

These as well as other objects of the present invention will become apparent when reading the accompanying description and drawings in which:

FIG. 1 is a schematic drawing showing a feedback system designed in accordance with the principles of the present invention.

FIG. 2 is a schematic diagram showing the potentiometer, electric bridge and meter structure of FIG. 1 in greater detail.

The system 10 of the present invention, as shown in FIGS. 1 and 2 is comprised of a bellows assembly 11 which is formed of a flexible resilient and compressible material, preferably having an accordian pleated type configuration and a hollow interior. In cases where anesthesia of vaginal musculature as it relates to human female frigidity is of concern, the bellows is configured so as to be insertable into the vagina, very near the entrance thereof. Any expansion and/or contraction of the vaginal musculature results in corresponding expansion and/or contraction of the bellows assemble 11 which is provided with an output opening 11a for coupling the negative or positive air pressure emitted from opening 11a to a piston assembly 12. The piston assembly is provided with an inlet opening 12a communicating with the outlet opening 11a of bellows assembly 11 through a flexible tubular member 13 or any other suitable conduit.

The piston assembly is comprised of a piston chamber 14 and a reciprocally mounted piston 15 capable of experiencing reciprocating movement in the direction shown by double-headed arrow 16 under control of positive or negative pressure entering into inlet opening 12a. A piston rod 17, rigidly secured to piston 16 is mechanically linked to a rotatable rod 18 by pin means 19 secured near the free end of rod 18 which further communicates with a slotted opening 17a in piston rod 17.

The opposite end of rod 18 is rigidly secured to a shaft 20 which, in turn, is further rigidly secured to a disc 21, preferably of substantial diameter. The arrangement is such that reciprocating movement of piston 16 and its piston rod 17 is converted into rotational movement of rod 18 about shaft 20. Any rotation of rod 18 in either of the directions indicated by double-headed arrow A results in the rotation of disc 21 about shaft 20 in the identical direction. The rotational movement of disc 21 is mechanically coupled to a potentiometer device 23 by means of a second connecting rod 22 coupled near the periphery of disc 21 by pin means 24. The opposite end of connecting rod 22 is coupled by a suitable pin means 25 to the free end of a rod 26 which is rigidly secured to a rotatable shaft 27. The rotation of rod 26 is imparted to the adjustable impedance assembly of potentiometer 23 (to be more fully described) which affects the balancing of an electrical bridge circuit 28. The dynamic changes in the impedance balancing of the bridge are sensed by an electrical meter 29 having a dial face with a graduated scale 30. The meter is provided with a movable pointer 31 cooperating with the graduated scale 30 and movable by a standard mechanism (not shown for purposes of simplicity) capable of converting the electrical signal representing the dynamic condition of the electrical bridge into a meter pointer position.

FIG. 2 shows the potentiometer 23, electrical bridge 28 and meter 29 in greater detail. The bridge 28 is comprised of first, second, third and fourth bridge arms arranged in a manner shown in FIG. 2. The first, second and third bridge arms 33, 34 and 35, respectively, are lumped parameter components (such as, for example, resistors) of a fixed value. The fourth bridge arm is comprised of potentiometer 23 which, in turn, has a movable wiper arm 36 electrically coupled to the common terminal 37 to which bridge arm 35 is connected. The wiper end of arm 36 makes sliding electrical contact with a resistive component 38, one terminal of which is electrically isolated and the other terminal of which is electrically connected to terminal 39 which is connected in common with bridge arm 33.

Impedance elements 33 and 34 are connected in common to terminal 40 which is further electrically connected to one side of a voltage source 43, the other side of which is connected to common terminal 37. The common terminal 41 between impedance elements 34 and 35 is electrically connected to one input terminal of meter 29 whose opposite input terminal is connected to common terminal 39 through a current limiting impedance element 42 which may be made adjustable, as shown, for purposes of adjusting the scale reading provided by meter 29.

In operation, the patient attempts to expand and/or contract those muscles in the region of interest, causing accompanying expansion and contraction of the bellows 11. The positive and negative air pressure causes appropriate movement of the piston assembly which is mechanically amplified by the disc assembly 21 to control the movement of the potentiometer arm 26 which is mechanically coupled to wiper arm 36, causing an unbalance in the bridge circuit (shown best in FIG. 2) which establishes a current flow through meter 29 which converts the current magnitude (and/or direction) into a meter pointer indication (in conjunction with scale 30) to provide the subject with visual observations of the subject's self-initiated efforts in achieving muscular contractions. Thus, through trial and error and feedback system indication of the effect of the trial and error muscle contraction, the subject can assess the effectiveness of his efforts expended in the exercise activity in terms of type, magnitude and duration of contractile control over the relevant muscle groups. The invention thus provides a useful, self-operated structure enabling a patient (on his own) to develop increased control over musculature in which kinesthetic sensation is lacking, to increase vascularization of muscle groups and to enhance kinesthetic-somesthetic perception by activating neuropathways through self-initiated activity which result in changes in muscle tonus.

Although there has been described a preferred embodiment of this novel invention, many variations and modifications will now be apparent to those skilled in the art. Therefore, this invention is to be limited, not by the specific disclosure herein, but only by the appending claims.

The embodiments of the invention in which an exclusive privilege or property is claimed are defined as follows:

1. Means for providing a visual indication of muscular activity comprising:
   resilient collapsible bellows means positioned adjacent the area of interest of the subject to be observed and making physical contact therewith;
   said bellows means including means having an output opening adapted to emit a stream of air of negative and positive pressure related respectively to expansion and contraction of the musculature being observed;
   piston means coupled to said output opening for converting the incoming air stream into reciprocating mechanical movement;
   mechanical amplifier means coupled to the output of said piston means for amplifying the linear movement produced by said piston means;
   said mechanical amplifier being comprised of a rotatable shaft; a disc secured to and rotated by said shaft; a linking arm having a first end pivotally coupled to the output of said piston means and a second end secured to said shaft for rotating said disc in a direction controlled by the direction of linear movement of said piston means;
   second conversion means;
   said mechanical amplifier means further comprising an output arm having a first end pivotally coupled to said disc near the periphery of said disc and a second end coupled to the input of said second conversion means;
   said second conversion means including a variable impedance whose impedance value is adapted to change with movement of said output arm;
   meter means coupled to said variable impedance for providing a visually observable output.

2. The device of claim 1 further comprising an electrical bridge having first, second, third and fourth arms connected in series;
   first, second and third fixed impedance means being provided in said first, second and third arms, respectively;
   said fourth arm comprising said impedance means having movable input means coupled to the second end of said first conversion means output arm for adjusting the impedance value of said adjustable impedance means under control of the rotation of said disc, said meter means being coupled to terminals of said third and fourth arms for providing a reading representative of the condition of said bridge.

3. The device of claim 2 further comprising:
   a power source having first and second output terminals;
   said first terminal being connected in common to a first end of two of said arms;
   said second terminal being connected in common to a first end of the remaining arms;
   said meter means having a pair of input terminals, one of said terminals being connected in common to the remaining ends of two of said arms and the remaining one of said terminals being connected in common to the remaining ends of the remaining arms of said bridge means.

4. The device of claim 3 wherein said meter means is comprised of a dial and movable indicating pointer;
   means for moving said pointer.

* * * * *